United States Patent
Savalle et al.

(10) Patent No.: US 10,389,741 B2
(45) Date of Patent: Aug. 20, 2019

(54) EDGE-BASED DETECTION OF NEW AND UNEXPECTED FLOWS

(71) Applicant: Cisco Technology, Inc., San Jose, CA (US)

(72) Inventors: Pierre-André Savalle, Rueil-Malmaison (FR); Laurent Sartran, Palaiseau (FR); Jean-Philippe Vasseur, Anchorage, AK (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 254 days.

(21) Appl. No.: 15/163,347

(22) Filed: May 24, 2016

(65) Prior Publication Data

US 2017/0279827 A1    Sep. 28, 2017

Related U.S. Application Data

(60) Provisional application No. 62/312,831, filed on Mar. 24, 2016.

(51) Int. Cl.
  *H04L 29/06* (2006.01)
  *H04L 29/08* (2006.01)

(52) U.S. Cl.
  CPC ...... *H04L 63/1425* (2013.01); *H04L 63/1416* (2013.01); *H04L 67/02* (2013.01); *H04L 69/22* (2013.01)

(58) Field of Classification Search
  USPC ............... 726/23, 2, 36; 713/150, 163, 181; 380/255, 264, 276
  See application file for complete search history.

(56) References Cited

U.S. PATENT DOCUMENTS

| | | | |
|---|---|---|---|
| 6,208,963 B1 * | 3/2001 | Martinez | G06K 9/6268 704/232 |
| 7,739,211 B2 * | 6/2010 | Coffman | G06Q 30/02 706/45 |
| 8,504,879 B2 * | 8/2013 | Poletto | H04L 41/064 709/224 |
| 9,038,180 B2 * | 5/2015 | Neil | H04L 63/1433 726/23 |
| 2015/0058994 A1 * | 2/2015 | Honig | G06F 21/554 726/25 |
| 2015/0186612 A1 * | 7/2015 | Gartseev | G06F 19/3418 702/19 |
| 2015/0341379 A1 * | 11/2015 | Lefebvre | H04L 63/1425 726/22 |

(Continued)

OTHER PUBLICATIONS

Perez et al. "A combined approach for suspicious networks detection in graphs" Charles Delaunay Institute, pp. 1-13.

*Primary Examiner* — Sharif E Ullah
(74) *Attorney, Agent, or Firm* — Behmke Innovation Group LLC; James Behmke; Stephen D. LeBarron

(57) ABSTRACT

In one embodiment, a device in a network identifies a new interaction between two or more nodes in the network. The device forms a feature vector using contextual information associated with the new interaction between the two or more nodes. The device causes generation of an anomaly detection model for new node interactions using the feature vector. The device uses the anomaly detection model to determine whether a particular node interaction in the network is anomalous.

17 Claims, 11 Drawing Sheets

(56) References Cited

U.S. PATENT DOCUMENTS

2016/0092774 A1\* 3/2016 Wang .................... G06F 16/285
                                                                  706/12
2017/0279847 A1\* 9/2017 Dasgupta ............ H04L 63/1458

\* cited by examiner

EDGE-BASED DETECTION OF NEW AND UNEXPECTED FLOWS

RELATED APPLICATIONS

This application claims priority to U.S. Provisional Application No. 62/312,831, filed Mar. 24, 2016, entitled "EDGE-BASED DETECTION OF NEW AND UNEXPECTED FLOWS," by Savalle et al., the contents of which are hereby incorporated by reference.

TECHNICAL FIELD

The present disclosure relates generally to computer networks, and, more particularly, to the edge-based detection of new and unexpected flows.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Generally, Internet Behavioral Analytics (IBA) refers to the use of advanced analytics coupled with various networking technologies, to detect anomalies in a network. Such anomalies may include, for example, network attacks, malware, misbehaving and misconfigured devices, and the like. For example, the ability to model the behavior of a device (e.g., a host, networking switch, router, etc.) allows for the detection of malware, which is complimentary to the use of firewalls that use static signature. Observing behavioral changes (e.g., deviation from modeled behavior) using flows records, deep packet inspection, and the like, lows for the detection of an anomaly such as an horizontal movement (e.g. propagation of malware, etc.) or an attempt to perform information exfiltration, prompting the system to take remediation actions automatically.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
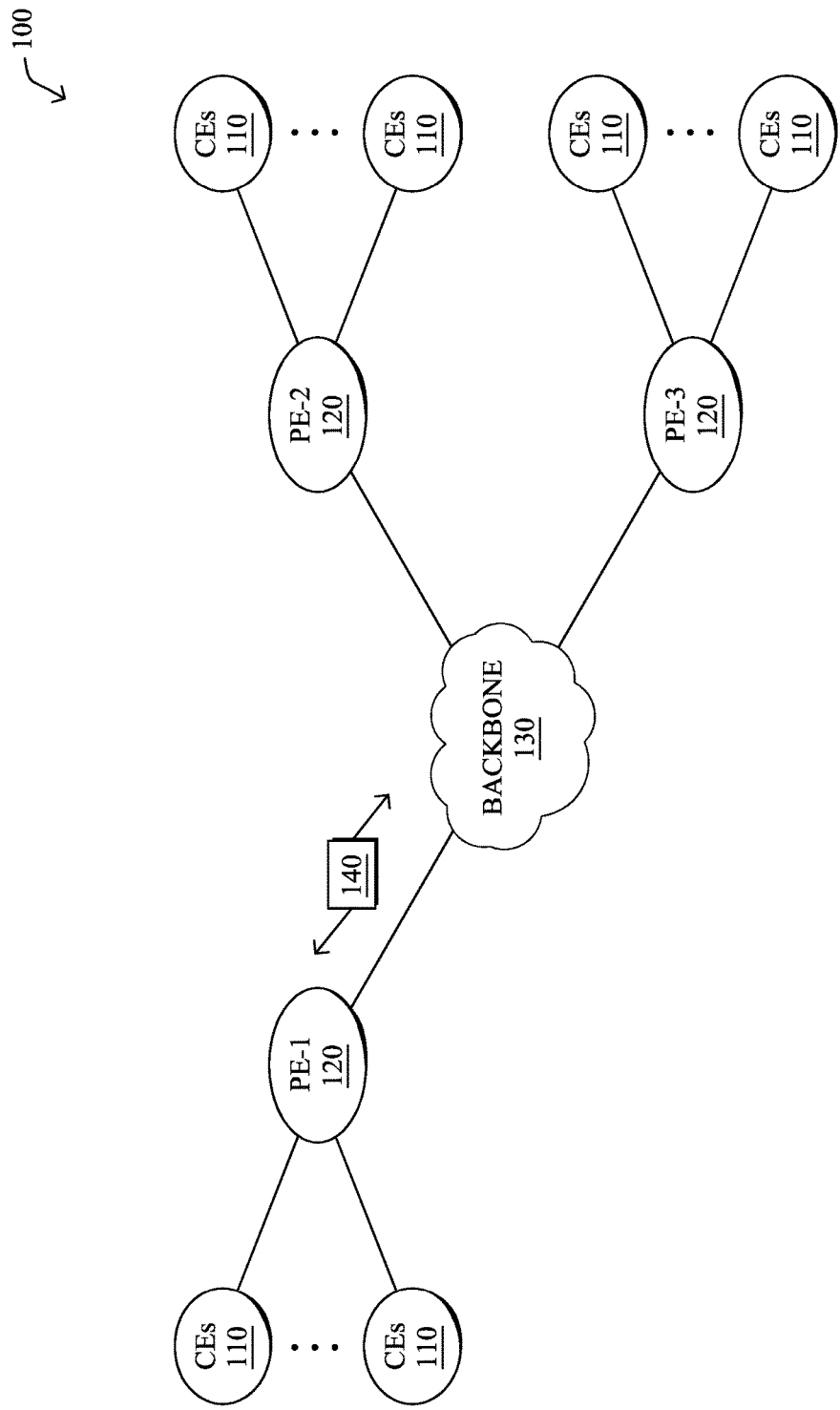
FIGS. 1A-1B illustrate an example communication network.

According to one or more embodiments of the disclosure, a device in a network identifies a new interaction between two or more nodes in the network. The device forms a feature vector using contextual information associated with the new interaction between the two or more nodes. The device causes generation of an anomaly detection model for new node interactions using the feature vector. The device uses the anomaly detection model to determine whether a particular node interaction in the network is anomalous.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
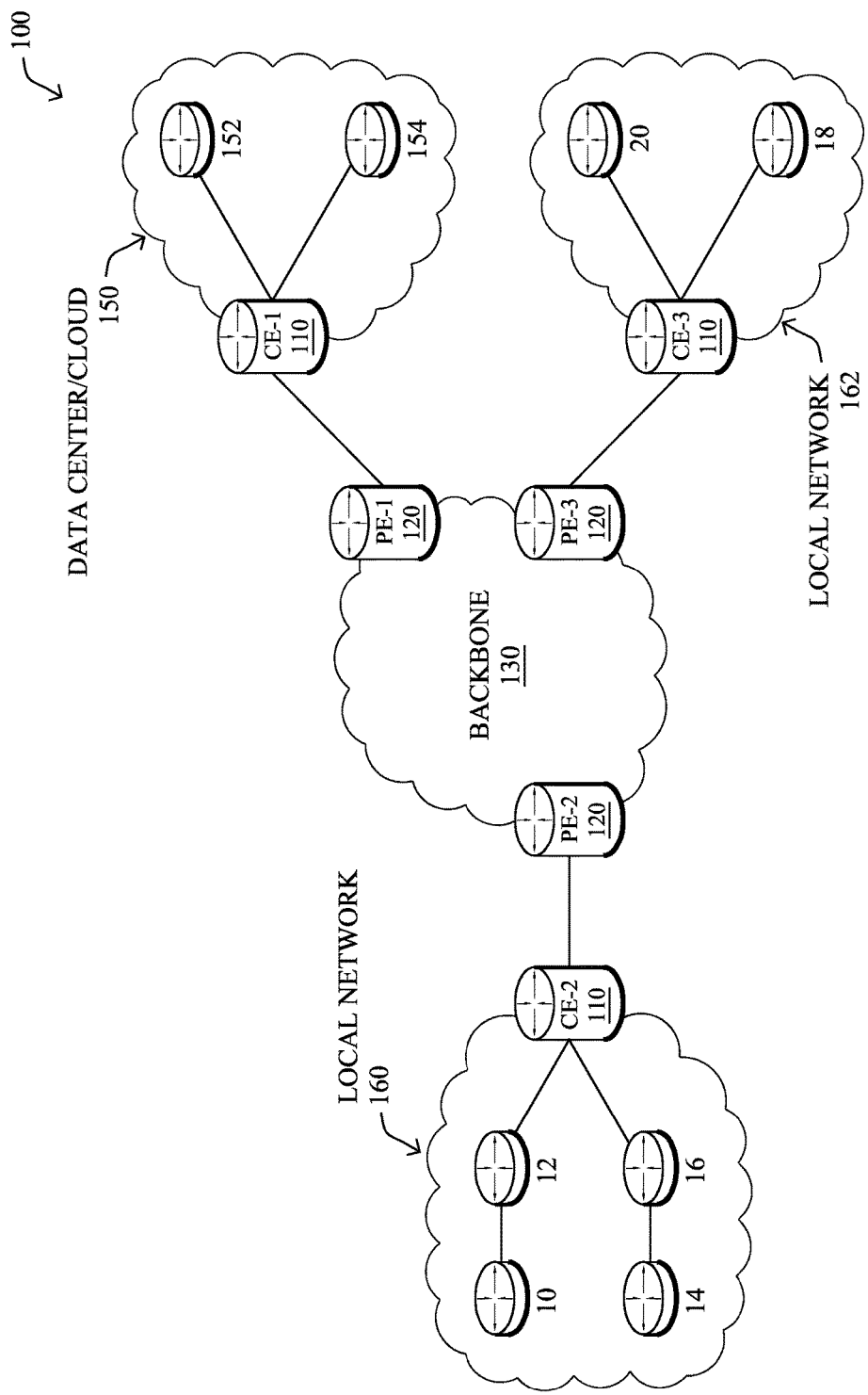

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
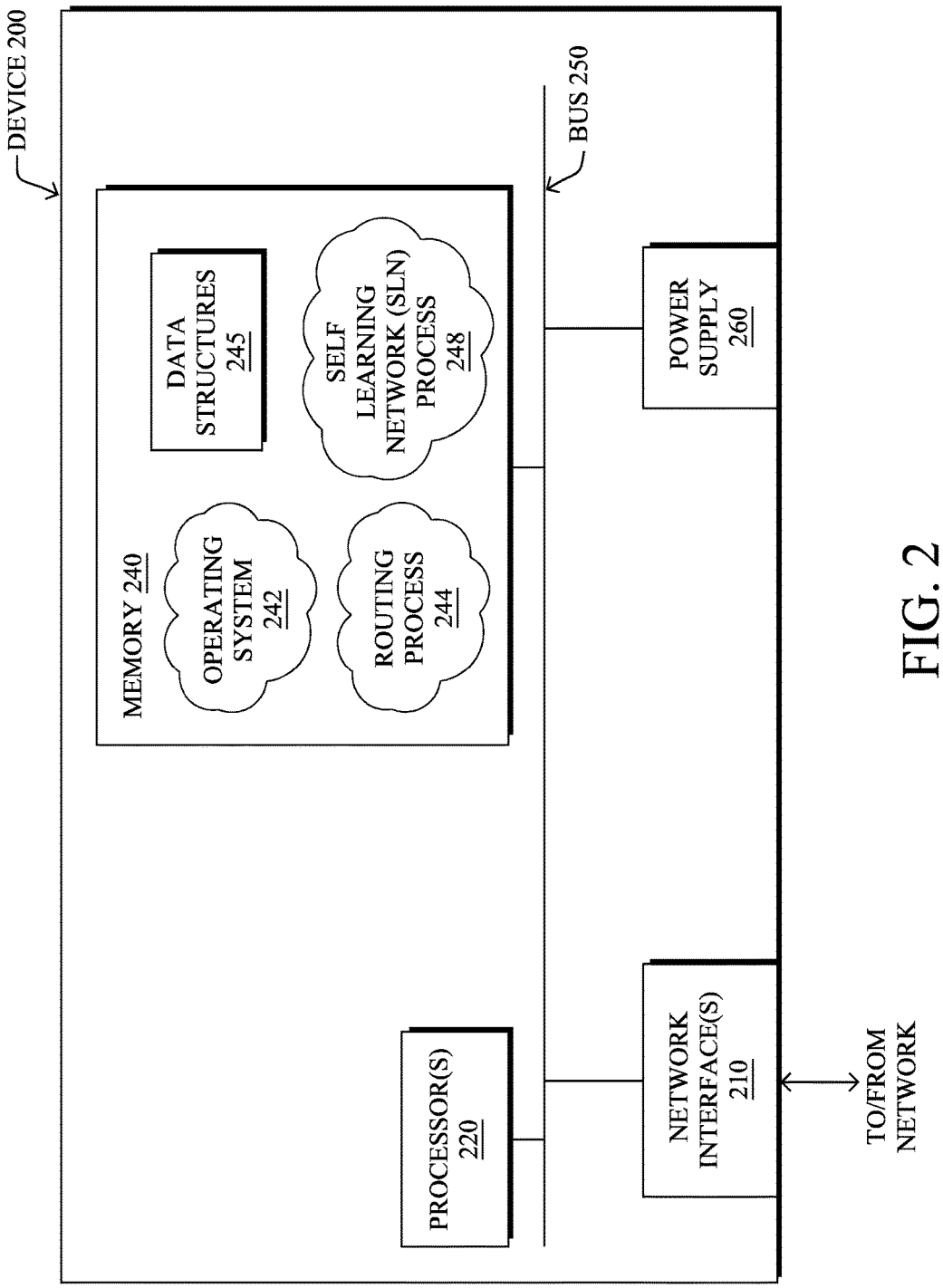
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may is construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
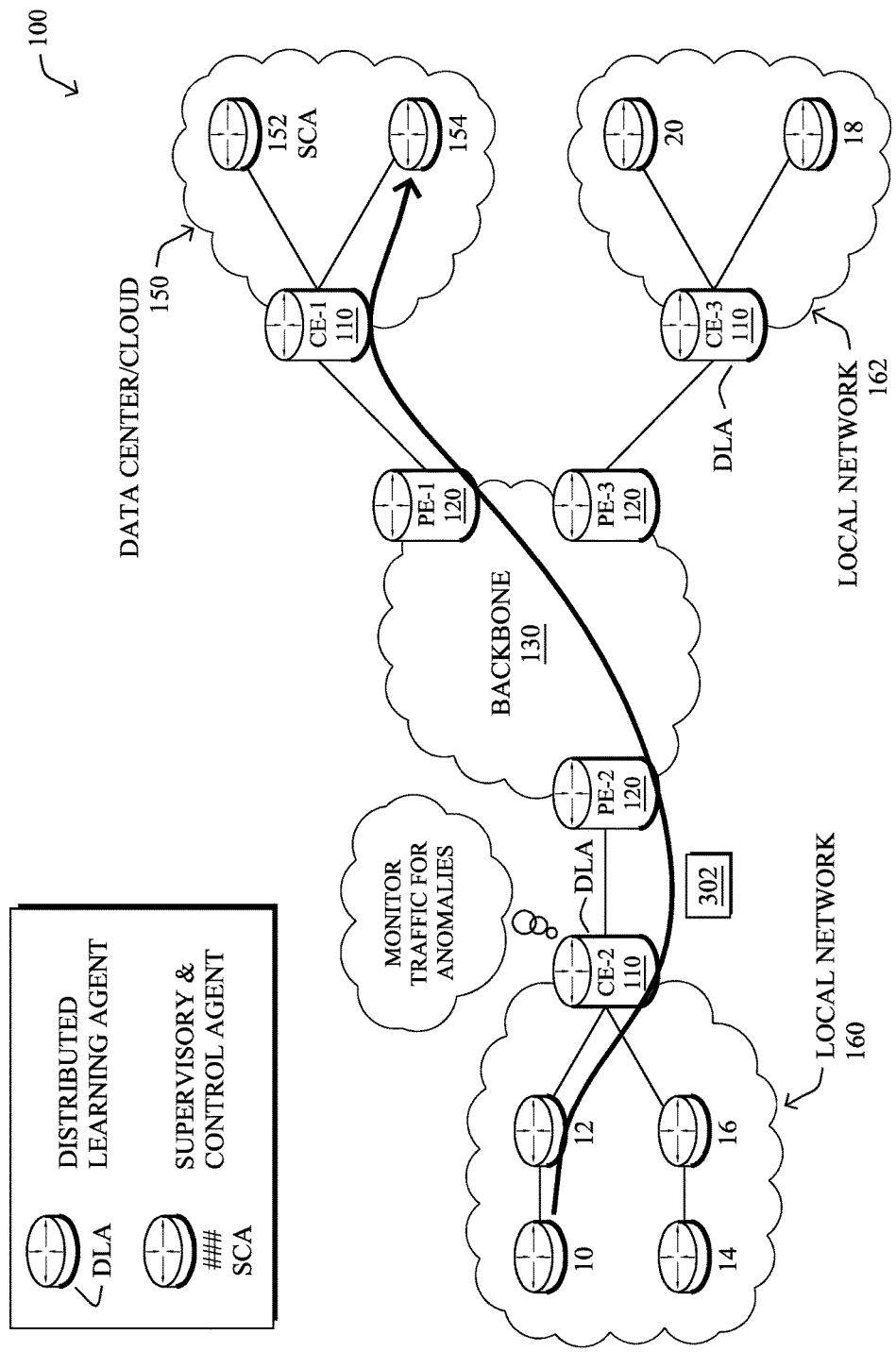
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
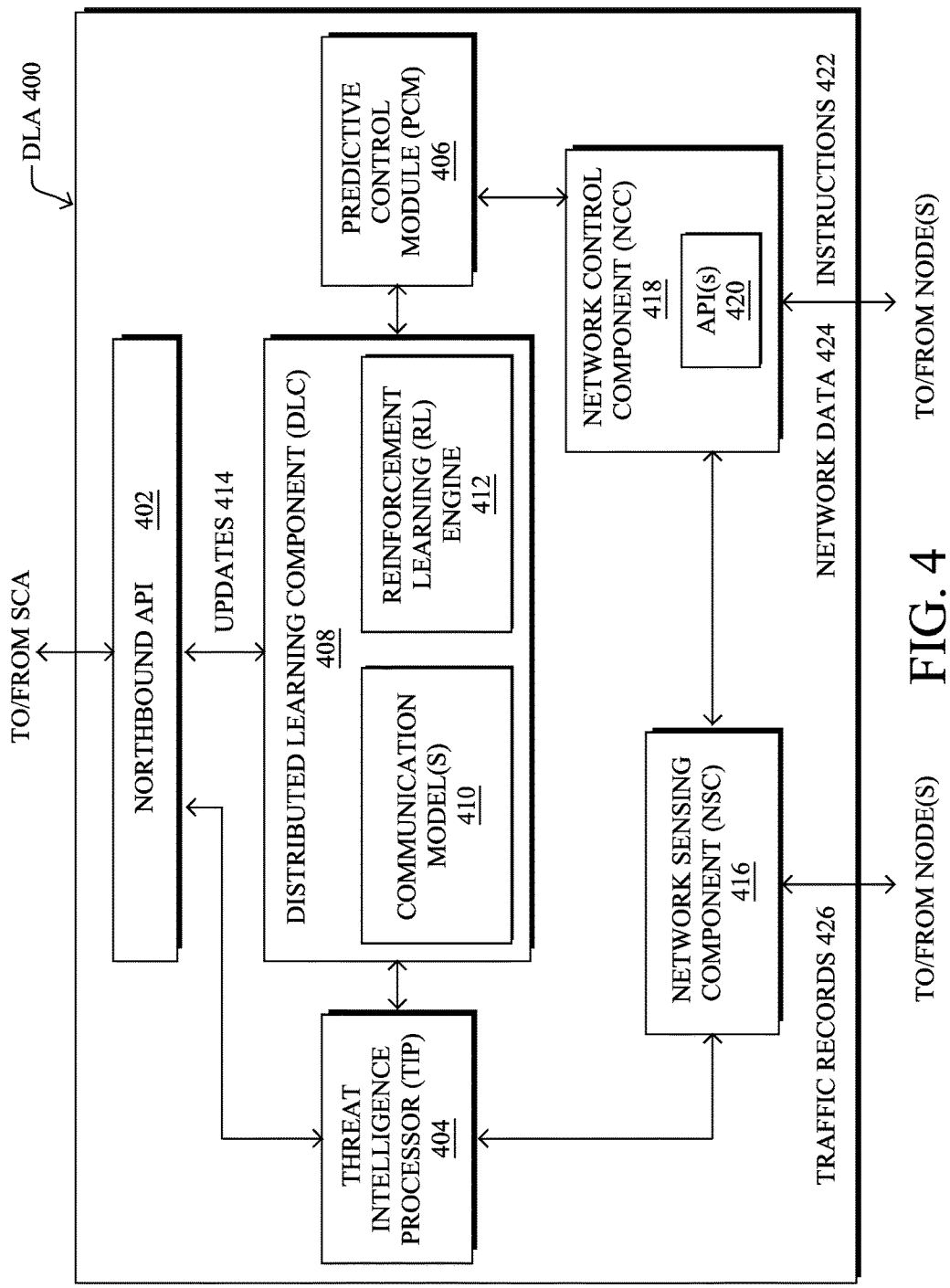
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, anomaly detection systems may detect different types of anomalies having different severities ranging from low to high. With the advent of IBA techniques, such an anomaly detection system may also characterize an anomaly based on two or more hosts starting to interact. This includes users accessing resources they do not usually access and may not be authorized to access. In some cases, this relationship can be formalized using a graphical representation of the network, where hosts are vertices and network traffic between two hosts implies an edge between the corresponding vertices. In other words, when the network is represented in graph form, a new interaction between host nodes corresponds to a new edge in the graph.

Being able to assess whether a new interaction between nodes is suspicious or anomalous is an important consideration for various reasons. First, network anomalies that are partly or fully characterized by the fact that the hosts or groups of hosts interacting do not usually interact, or are not supposed to interact, are ubiquitous. Furthermore, tracking suspicious occurrences in complex networks is simply impractical considering the full degree of meshing between locations multiplied by the number of applications. In addition, network traffic is increasingly encrypted, making it difficult or impossible to analyze the contents of packets. While methods based on monitoring such interactions can have high recall (e.g., detection rates), they also typically exhibit low precision, as these types of events are very common. As a consequence, additional systems and methods may be required to triage new interactions and focus on the most unusual events.

Edge-Based Detection of New and Unexpected Flows

The techniques herein provide a methodology for the detection of anomalies in computer networks by detecting suspicious new interactions. In some aspects, a component monitors new interactions, and another gathers context about the circumstances where these interactions occur. In a further aspect, these distributed components may provide a stream of data to another distributed component, where statistical models are learned to detect new interactions occurring in unusual contexts, and flag them as anomalous. In yet another aspect, another mechanism is introduced that can be located either directly on the learning agents or located dynamically on a central controller or other DLA with enough computational and network capacity.

Specifically, according to one or more embodiments of the disclosure as described in detail below, a device in a network identifies a new interaction between two or more nodes in the network. The device forms a feature vector using contextual information associated with the new interaction between the two or more nodes. The device causes generation of an anomaly detection model for new node interactions using the feature vector. The device uses the anomaly detection model to determine whether a particular node interaction in the network is anomalous.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, the techniques herein specify an approach for the detection of unusual and anomalous new interactions between hosts in a computer network that is suited for a distributed anomaly detection system (such as, but not limited to, SLNs). In the following, interactions generally refer to the observation of network traffic between either two hosts or between groups of hosts for a given application classification. FIGS. 5A-5D illustrate examples of a DLA detecting new and unexpected flows at the edge of a network, according to various embodiments.

Figure 5A:
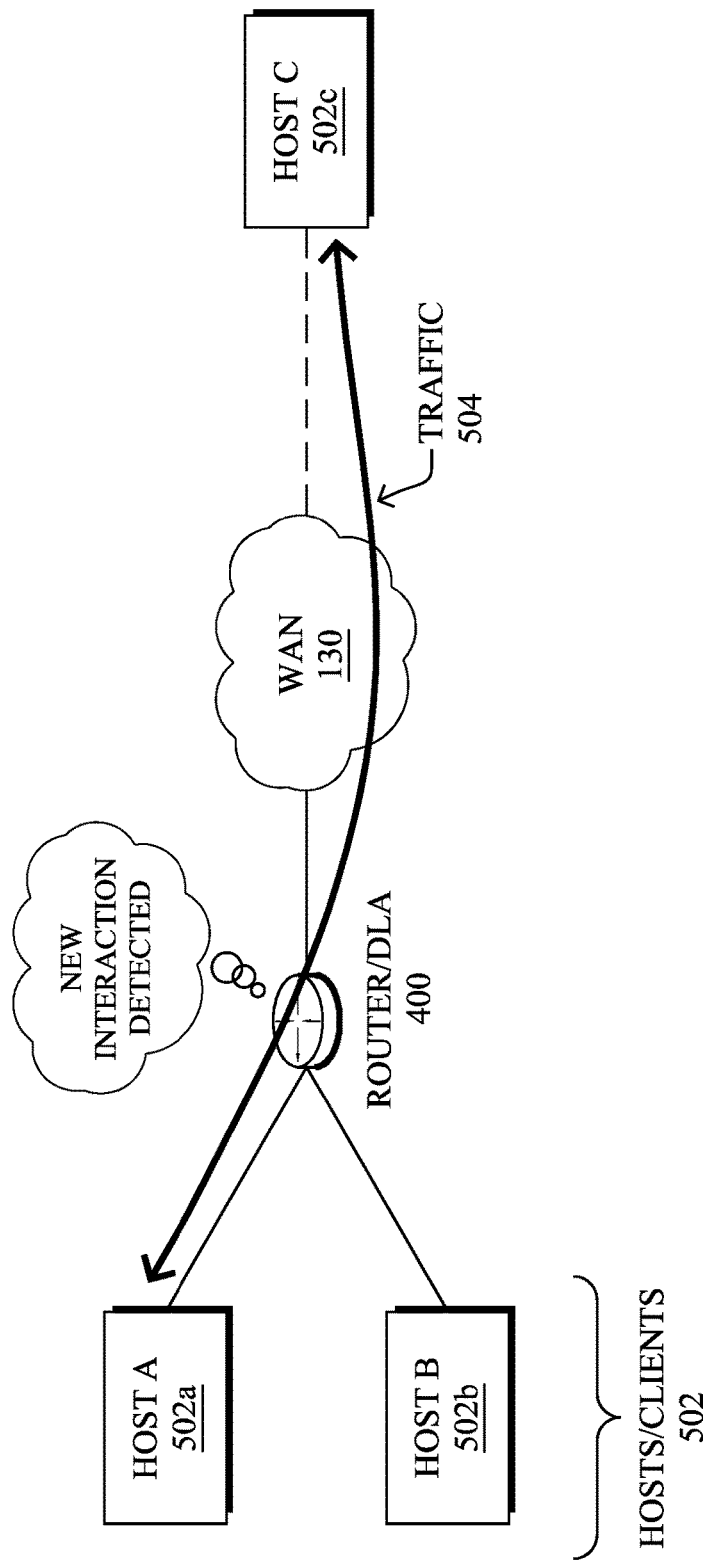
FIGS. 5A-5D illustrate examples of a DLA detecting new and unexpected flows at the edge of a network.

In one aspect, the techniques herein introduce a first component that monitors network traffic for new interactions between hosts and groups of hosts that have not been observed during a time window. The main responsibility of this component is to keep track of which entities have interacted in the past, essentially building a graph representation of the network. In various embodiments, a router or other device at the edge of the local network may perform this functionality. For example, as shown in FIG. 5A, router/DLA 400 may monitor traffic associated with hosts/clients 502, such as hosts 502a-502b in the local network of DLA 400. Notably, DLA 400 may observe interactions on the network by receiving aggregated traffic statistics (e.g., Netflow records, etc.) and/or by performing DPI on the packets of the traffic. In other words, in one embodiment, NSC 416 of DLA 400 may be configured to detect new interactions between host nodes.

For purposes of illustration, assume that host 502a begins communicating with host 502c. Accordingly, DLA 400 may observe the presence of new traffic 504 between hosts 502a and 502c. In turn, DLA 400 may determine that traffic 504 represents a new interaction between nodes, if hosts 502a and 502c have not communicated before within a predefined time window. In one embodiment, the time window can be of infinite duration, where a new interaction is an interaction that has never been observed by the system since it was first started. In another embodiment, the window can also have a finite duration, in which case a new interaction is an interaction that has not been observed within the time window.

Whenever a new interaction is identified, the device may flag the corresponding interaction for processing by the rest of the pipeline. Optionally, the device may employ a policy to determine which new interactions are of interest. Notably, some classes of new traffic (e.g., for a given application) may not be of interest whereas other types of traffic may be highly relevant (e.g., an application that may be suspected of using a covert channel). Using such selection criteria may reduce the number of anomalies. In some embodiments, a central controller (e.g., SCA) may specify the policy and upload the policy to DLA 400 via configuration/control planes.

Figure 5B:
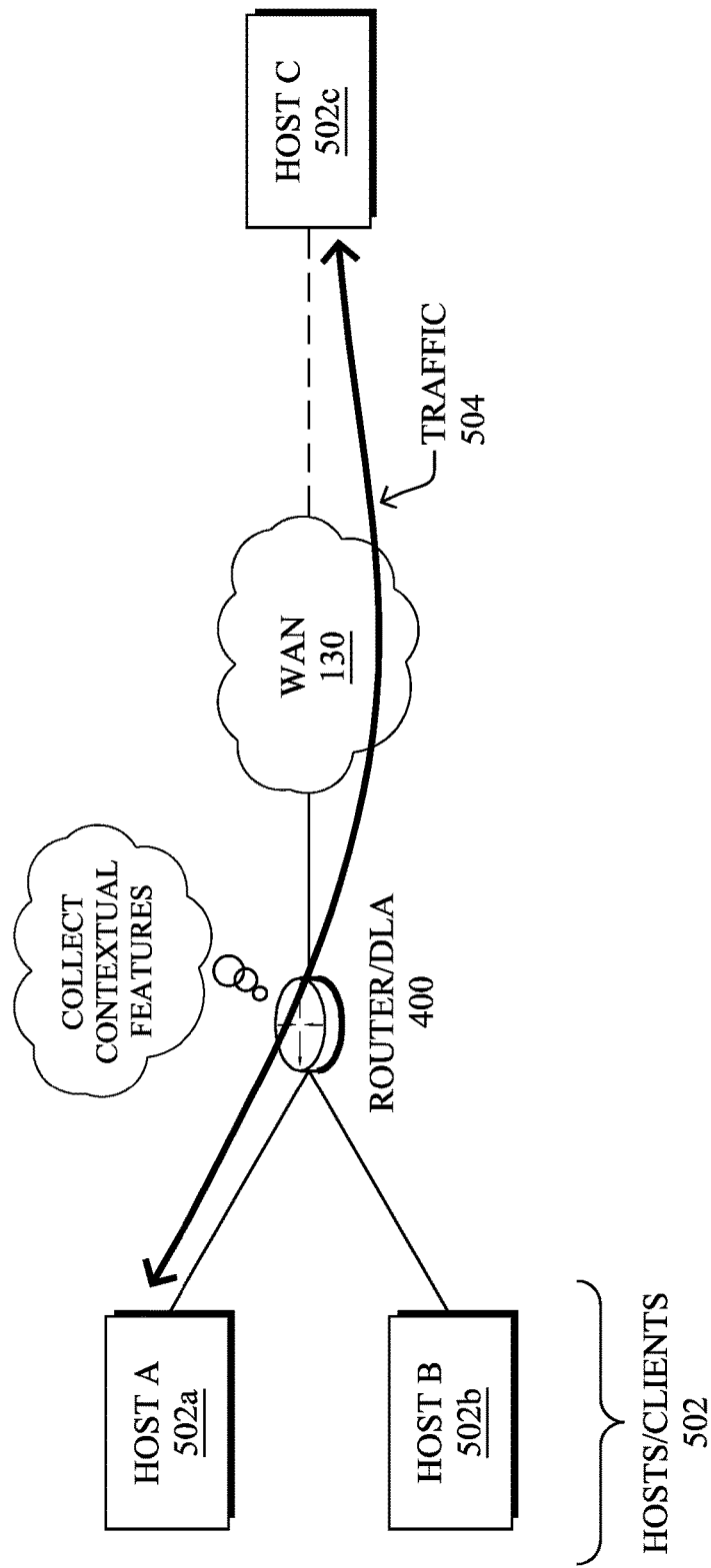

As shown in FIG. 5B, another aspect of the techniques herein introduces a further behavior of DLA 400 that monitors network traffic and produces features based on contextual information regarding a new node interaction flagged by DLA 400. Formally, whenever an interaction between two hosts or two groups of hosts is marked as corresponding to a new interaction, DLA 400 may extract a vector of features corresponding to the interaction from the network traffic (e.g., via NSC 416 and/or APIs 420). In further embodiments, DLA 400 may alert another device in the network to collect the contextual information regarding a new node interaction.

The collected features can include, but are not limited to, any or all of the following:
  Instantaneous or historical information about the hosts or groups of hosts involved, such as corresponding to the characteristics of their traffics.
  Instantaneous or historical information about the network, providing higher-level statistics about characteristics of the overall traffic in the network.

The contextual information/characteristics may include, but are not limited to, any or all of the following:
  Features that indicate whether the hosts tend to exchange a large amount of traffic.
  Features that indicate whether the hosts tend to play a central or hub role in the network, based for instance on Hyperlink-Induced Topic Search scores, PageRank scores, or similar metrics based on notions of inward and outward graph degrees.
  Features related to the time of day, day of week, or other temporal characteristics.
  Features related to how frequent creation of new interactions is in various contexts (e.g., rates and frequencies at which new interactions are observed).
  Features related to the contents of the traffic, such as the output of a traffic classification model, information related to ports, IP protocols, or even to raw packet contents.

In another embodiment, the system may be configured to allow a user to dynamically update the characteristics. The SCA can then push the policy to DLA 400 and any other DLA. For example, northbound API 402 of DLA 400 may receive a policy from an SCA that controls which features are collected, allowing for the collection of more or less contextual information, as needed.

Figure 5C:
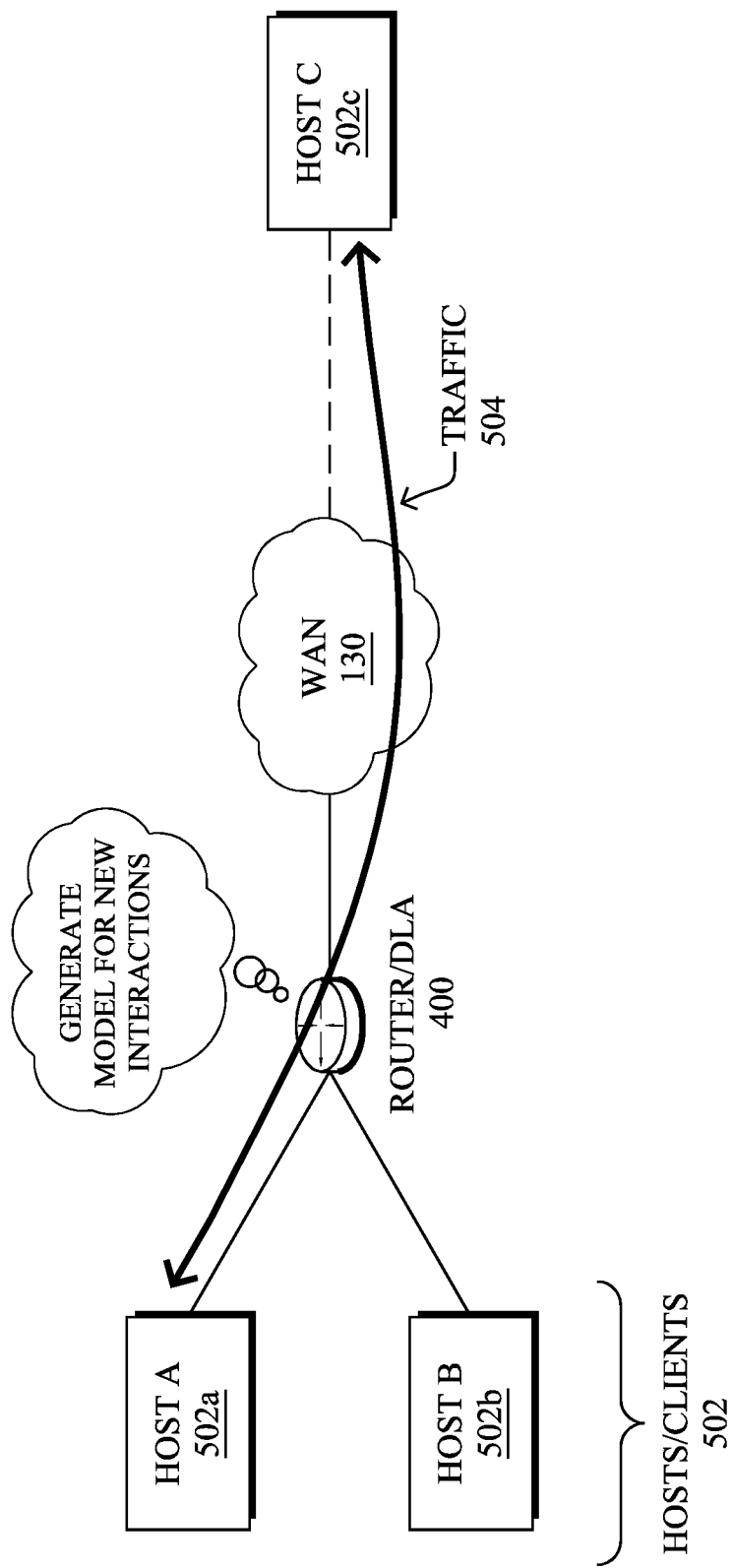

As shown in FIG. 5C, DLA 400 may cause the generation of a new interaction model, based on the feature vector(s) associated with the new node interaction(s). For example, DLA 400 may send an IPv4 or IPv6 unicast message called NewEdgeFeatures( ) to another DLA the SCA, or another device specifically configured to generate anomaly detection models, in some embodiments. Depending on the implementation, this message may also be sent through function or method calls within the same process, through local inter-process communication, or through remote procedure calls. In other words, DLA 400 may send the collected features to another local process, to another device in the network, or both.

In further aspects, the techniques herein introduce a mechanism that builds statistical models of these new interaction events, based on the features extracted by the DLA on new interactions/edge creations. The objective of this mechanism is to discern between usual and unusual situations when new interactions occur. Notably, when this mechanism receives a NewEdgeFeatures( ) message, the receiving module may update its statistical model(s). In addition, this mechanism may attribute a score to the corresponding new edge creation event. The statistical models can include both classification models and density estimation models. Furthermore, various effects relevant to anomaly detection in network traffic can be used. For instance, a full-blown seasonality modeling model can be used based on the previously mentioned features and characteristics related to time of day, day of week, etc. The models can also be combined with rule-based systems, to form an anomaly detector. For instance, all new interactions in a given context might be considered non-anomalous in terms of the score produced if the frequency of new interaction creation exceeds a threshold.

In some embodiments, the model generator may be located directly on a DLA, such as DLA 400 shown (e.g., DLC 408 may be configured to generate a model, as well). In this case, the data collection and statistical modeling are both performed at the same location at the network edge. In another embodiment, the model generator may be located on a central controller (e.g., SCA) or on other DLAs. The location may be either pre-selected or selected dynamically based on the computational capacity of the agents and controllers, but also on their location within the network. In particular, a single instance of the model generator may be used to build statistical models using data collected by multiple DLAs, thus gaining more insight as to the overall network topology and allowing for learning higher quality models. This is especially attractive as a single DLA has a point of view that is partly limited in terms of what network topology the DLA can estimate. Regardless of where the model is constructed, the model generation process or device may distribute the new model to DLA 400 and any other DLA, as needed.

Figure 5D:
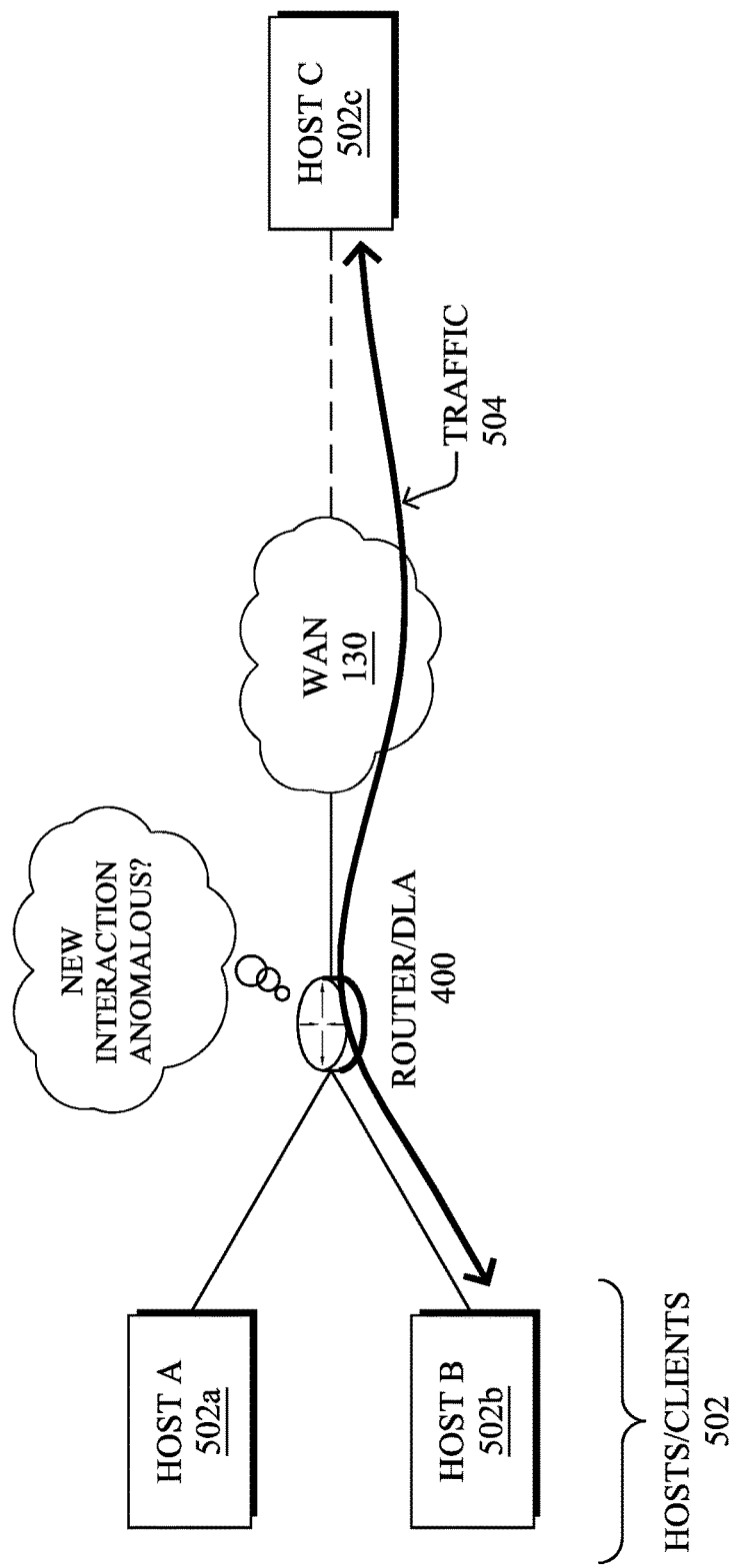

As shown in FIG. 5D, DLA 400 may use the new interaction model, to mark new interactions as either anomalous or non-anomalous. The new edges in the network considered anomalous may be passed downstream to give rise to anomalies. The anomaly detection process and its parameterization may vary and are not limited to the possibilities described thereafter. In one variant, the anomaly detector considers scores above a predefined threshold as anomalous. In another variant, the anomaly detector may learn the distribution of the scores over time so that low-likelihood scores are considered anomalous.

Figure 6:
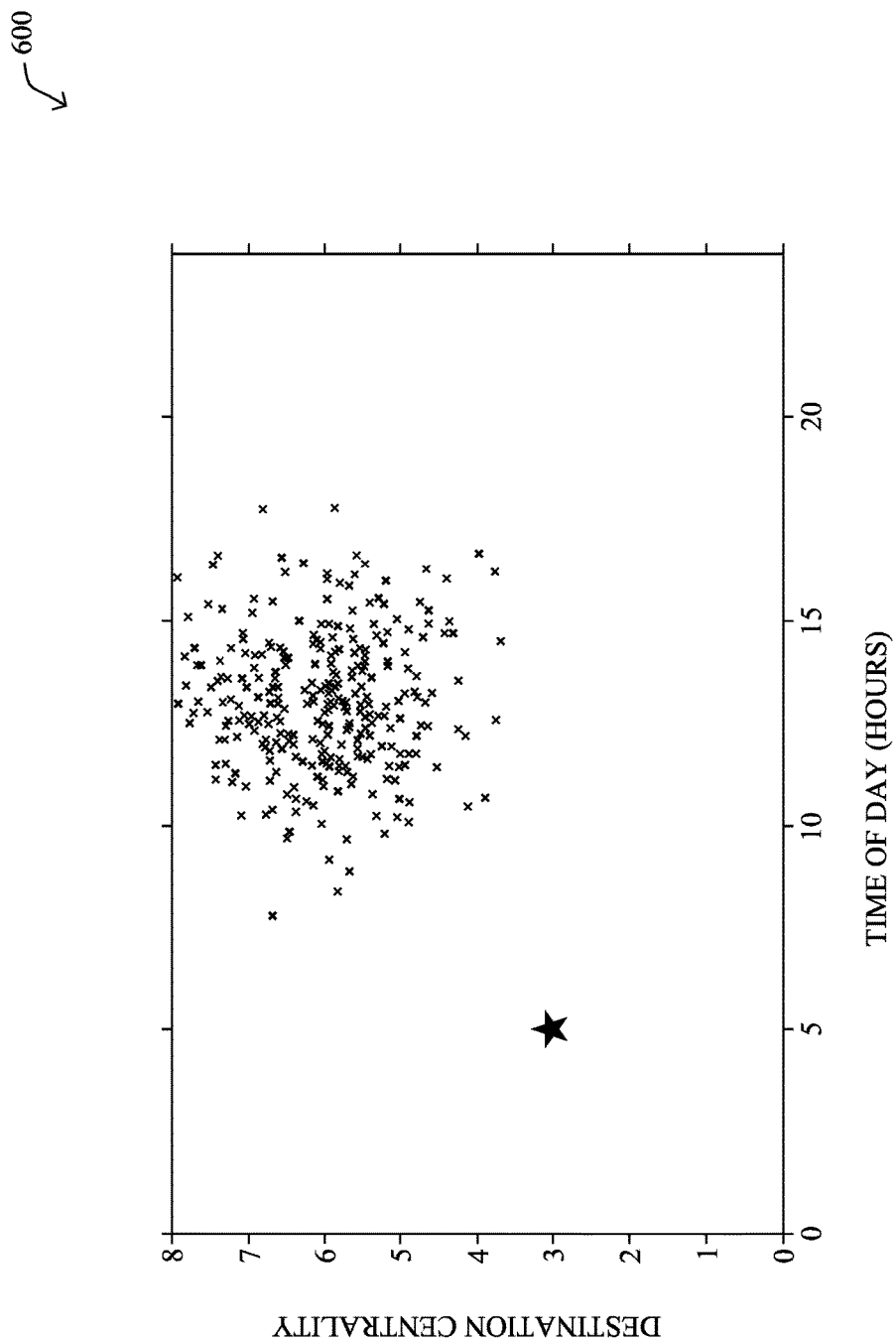
FIG. 6 illustrates a plot of destination centrality vs. time of day.

FIG. 6 illustrates a plot 600 of destination centrality vs time of day, in some embodiments. Plot 600 generally demonstrates the concepts herein, in a simplified setting, where only two characteristics are extracted from the creation of new interaction between nodes. In particular, the system extracted the time of day associated with the new interaction, as well as a measure of the centrality of the destination host in the network. The "X" points shown in plot 600 correspond to actual new interactions, and, for this context, tend to cluster well around work hours of the day, and high values of destination centrality. These features can then be used to train a new interaction model for purposes of anomaly detection. For example, the "star" shown in plot 600 would be considered associated with an anomalous new interaction.

Figure 7:
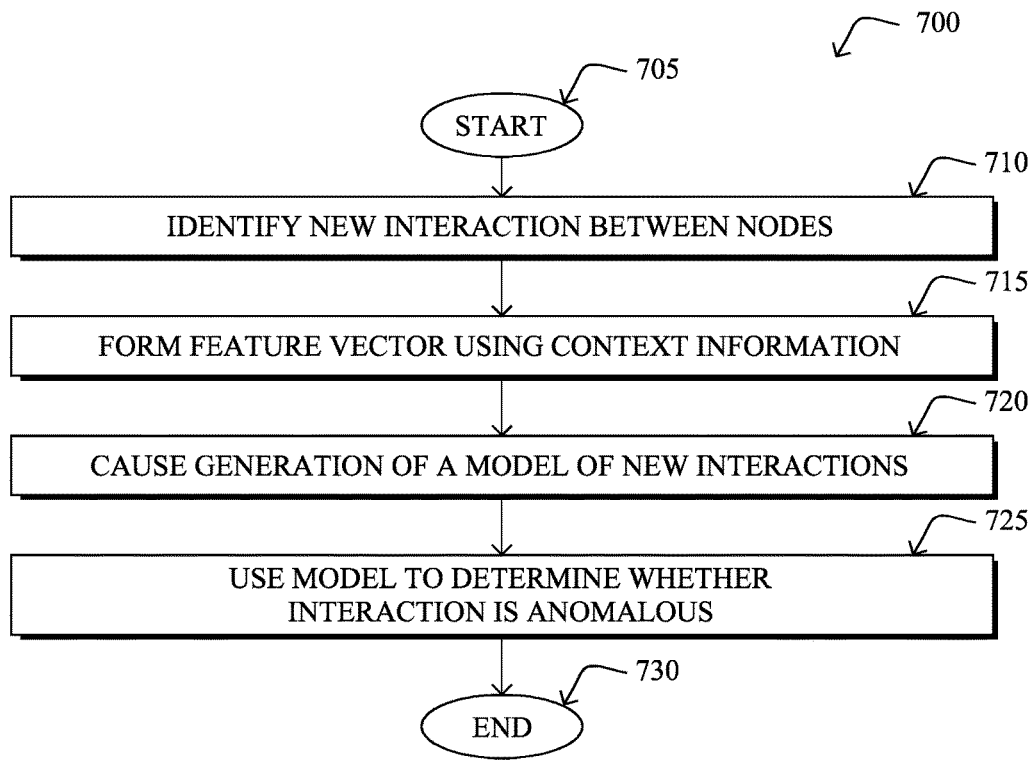
FIG. 7 illustrates an example simplified procedure for detecting new and unexpected traffic flows in a network.

FIG. 7 illustrates an example simplified procedure for detecting new and unexpected traffic flows in a network, in accordance with the embodiments herein. Generally, procedure 700 may be performed by a specialized computing device, such as an edge router. Procedure 700 may start at step 705 and continues on to step 710 where, as described in greater detail above, the device may identify a new interaction between two or more nodes in the network. In some embodiments, the device may determine that a particular node interaction is new, if the device has not observed such an interaction with a given time window. For example, the device may determine that an interaction is new if the device has not observed such an interaction within the past n-number of hours, minutes, days, etc., if the device has never observed such an interaction, or the like.

At step 715, as detailed above, the device may form a feature vector using collected context information regarding the new interaction. Example features may include, but are not limited to, features that indicate whether the hosts tend to exchange a large amount of traffic, features that indicate whether the hosts tend to play a central or hub role in the network, temporal features, features that indicate how frequently new interactions occur, features related to the content of the traffic (e.g., traffic classification model outputs, packet content information, raw packets, address or port information, protocol information, etc.), or any other information surrounding the new interaction.

At step 720, as described in greater detail above, the device may cause the generation of a model of new interactions based on the feature vector. In some embodiments, the device may generate the model locally. In other embodiments, the device may send the feature vector to another device in the network for model generation, such as an SCA or other supervisory device, another DLA, or the like. In turn, the corresponding device may push the generated model back to the device for use during anomaly detection.

At step 725, the device may use the generated anomaly detection model to determine whether a particular new interaction between nodes is anomalous. For example, if a particular interaction is both "new" and is a statistical outlier from other new node interactions, the device may determine that the particular interaction is anomalous. In turn, the device may take any number of actions, such as flagging, dropping, or rerouting the traffic, generating an anomaly alert, etc. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for an anomaly detection system to score new interactions between hosts, allowing the system to detect many kinds of network anomalies that are specific to the nature of the hosts interacting and the context, and not to the actual packet or traffic contents. The techniques also allow for the possible aggregation of signals from multiple DLAs.

While there have been shown and described illustrative embodiments that provide for edge-based detection of new and unexpected traffic flows, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
identifying, by a device in a network, a new interaction between two or more nodes in the network, wherein the two or more nodes are hosts and the device is an edge router;
forming, by the device, a feature vector using contextual information associated with the new interaction between the two or more nodes;
causing, by the device, generation of an anomaly detection model for new node interactions using the feature vector, wherein causing the generation includes:
providing, by the device, the feature vector to another device configured to generate the anomaly detection model based in part on the feature vector, and
receiving, at the device, the anomaly detection model from the other device; and
using, by the device, the anomaly detection model to determine whether a particular node interaction in the network is anomalous, wherein the determination is specific to the two or more nodes in the new interaction and the contextual information in the feature vector.

2. The method as in claim 1, wherein the contextual information comprises a measure of destination centrality.

3. The method as in claim 1, wherein the contextual information includes a results of deep packet inspection of a packet associated with the new interaction between the two or more nodes.

4. The method as in claim 1, wherein the contextual information comprises at least one of: a rate or frequency of new node interactions in the network.

5. The method as in claim 1, wherein the contextual information comprises an output of a traffic classification model.

6. The method as in claim 1, wherein the contextual information comprises traffic information associated with the two or more nodes comprising at least one of: a historical amount of traffic communicated between the two or more nodes, temporal information regarding historical traffic communicated between the two or more nodes, or packet information.

7. The method as in claim 1, wherein causing the generation of the anomaly detection model for new node interactions using the feature vector comprises:
generating, by the device, the anomaly detection model based in part on the feature vector.

8. The method as in claim 1, wherein the anomaly detection model comprises at least one of: a density estimation model or a classification model.

9. The method as in claim 1, wherein identifying the new interaction between the two or more nodes comprises:
determining, by the device, that the two or more nodes have not communicated with one another within a predefined time window.

10. An apparatus, comprising:
one or more network interfaces to communicate with a network;
a processor coupled to the one or more network interfaces and configured to execute one or more processes; and
a memory configured to store a process executable by the processor, the process when executed operable to:
identify a new interaction between two or more nodes in the network, wherein the two or more nodes are hosts and the apparatus is an edge router;
form a feature vector using contextual information associated with the new interaction between the two or more nodes;
cause generation of an anomaly detection model for new node interactions using the feature vector, wherein the causing the generation includes:
providing the feature vector to another device configured to generate the anomaly detection model based in part on the feature vector, and
receiving the anomaly detection model from the other device; and
use the anomaly detection model to determine whether a particular node interaction in the network is anomalous, wherein the determination is specific to the two or more nodes in the new interaction and the contextual information in the feature vector.

11. The apparatus as in claim 10, wherein the contextual information comprises a measure of destination centrality.

12. The apparatus as in claim 10, wherein the contextual information comprises at least one of: a rate or frequency of new node interactions in the network, or an output of a traffic classification model.

13. The apparatus as in claim 10, wherein the contextual information comprises traffic information associated with the two or more nodes comprising at least one of: a historical amount of traffic communicated between the two or more nodes, temporal information regarding historical traffic communicated between the two or more nodes, or packet information.

14. The apparatus as in claim 10, wherein the another device is configured to generate the anomaly detection model based in part on the feature vector and based in part on feature vectors from a plurality of deployed learning agents in the network.

15. The apparatus as in claim 10, wherein the anomaly detection model comprises at least one of: a density estimation model or a classification model.

16. The apparatus as in claim 10, wherein the apparatus identifies the new interaction between the two or more nodes by determining that the two or more nodes have not communicated with one another within a predefined time window.

17. A tangible, non-transitory, computer-readable media having software encoded thereon, the software when executed by a device in a network configured to:
identify a new interaction between two or more nodes in the network, wherein the two or more nodes are hosts and the identification is made at an edge router;

form a feature vector using contextual information associated with the new interaction between the two or more nodes;
cause generation of an anomaly detection model for new node interactions using the feature vector, wherein the causing the generation includes:
 providing the feature vector to another device configured to generate the anomaly detection model based in part on the feature vector, and
 receiving the anomaly detection model from the other device; and
use the anomaly detection model to determine whether a particular node interaction in the network is anomalous, wherein the determination is specific to the two or more nodes in the new interaction and the contextual information in the feature vector.

\* \* \* \* \*

UNITED STATES PATENT AND TRADEMARK OFFICE
CERTIFICATE OF CORRECTION

PATENT NO. : 10,389,741 B2
APPLICATION NO. : 15/163347
DATED : August 20, 2019
INVENTOR(S) : Savalle et al.

It is certified that error appears in the above-identified patent and that said Letters Patent is hereby corrected as shown below:

In the Specification

Column 7, Line 66, please amend as shown:
ing machine may construct a model of normal network Signed and Sealed this
Seventeenth Day of March, 2020

Andrei Iancu
*Director of the United States Patent and Trademark Office*